United States Patent [19]

Ellegood et al.

[11] Patent Number: 4,692,196
[45] Date of Patent: Sep. 8, 1987

[54] APPARATUS AND METHOD FOR WRAPPING AN EXTERNAL TAPE SUPPORT ABOUT A FILTER ELEMENT ASSEMBLY

[75] Inventors: Norman W. Ellegood, Fremont; Joel L. Fritsche, Sunnyvale, both of Calif.; John J. Groezinger, Dunlap, Ill.; Keichi Ikeda, San Jose, Calif.; Ronald W. Streitmatter, Toulon, Ill.

[73] Assignee: Caterpillar Inc., Peoria, Ill.

[21] Appl. No.: 812,678

[22] Filed: Dec. 23, 1985

[51] Int. Cl.$^4$ .............................................. B32B 1/00
[52] U.S. Cl. .................................. 156/187; 156/195; 156/425; 156/446; 156/458; 242/56 A; 493/306
[58] Field of Search .......... 242/56 A, 158 R, 158.1 R, 242/158.4 R; 156/446, 425, 448, 456, 457, 187, 195; 100/13; 493/306

[56] References Cited

U.S. PATENT DOCUMENTS

| | | | |
|---|---|---|---|
| 2,643,016 | 6/1953 | Steckling | 156/468 |
| 2,691,490 | 10/1954 | Gerard | 242/56 A |
| 3,241,680 | 3/1966 | Humbert, Jr. | 210/457 |
| 3,257,087 | 6/1966 | Kriete et al. | 242/158.4 R |
| 3,259,336 | 7/1966 | Hibbard | 242/158 R |
| 3,398,904 | 8/1968 | Adams | 242/18 A |
| 3,472,462 | 10/1969 | Young | 242/56 A |
| 3,730,795 | 5/1973 | Medney et al. | 156/446 X |
| 3,744,730 | 7/1973 | Burnage | 242/56 A |
| 3,848,824 | 11/1974 | Schijndel | 242/56 A |
| 3,901,456 | 8/1975 | Dradier | 242/18 A |
| 3,930,620 | 1/1976 | Taitel | 242/56 A |
| 4,138,069 | 2/1979 | Bonzo et al. | 242/18 A |
| 4,402,830 | 9/1983 | Pall | 210/457 |
| 4,541,583 | 9/1985 | Forman et al. | 242/56 A |

Primary Examiner—David Simmons
Attorney, Agent, or Firm—Robert A. McFall

[57] ABSTRACT

An automatic wrapping apparatus for wrapping an external tape support about a filter element includes an indexable turret assembly having a plurality of filter element clamps rotatably mounted at spaced radial positions on the indexable turret. Means are provided at one of the radial positions for rotating a filter element clamp about a longitudinal axis. The wrapping apparatus also includes means for selectively varying the position of the strand of tape along the longitudinal axis during rotation of the clamp. Further, the apparatus includes means for severing the strand of tape and wrapping the severed ends about a respective pleated filter assembly.

A method for wrapping an external tape support about a pleated filter element includes clamping a pleated filer between opposed face surfaces, contacting one end of a continuous strand of adhesive coated tape with an outer pleated edge surface of the pleated filter assembly carried in the clamp fixture, rotating the filter element assembly about a longitudinal axis and simultaneously move the position of the taped material in one direction along the longitudinal axis to spirally wrap the tape externally about the pleated filter element. After wrapping, the filter element is indexed to a second radial position and the trailing strand of tape is severed, producing a loose end which is pressed into contact with the outer ede surfaces of the pleated filter element.

The present invention is particularly useful in the automatic assembly of cylindrical filter cartridge elements.

9 Claims, 5 Drawing Figures

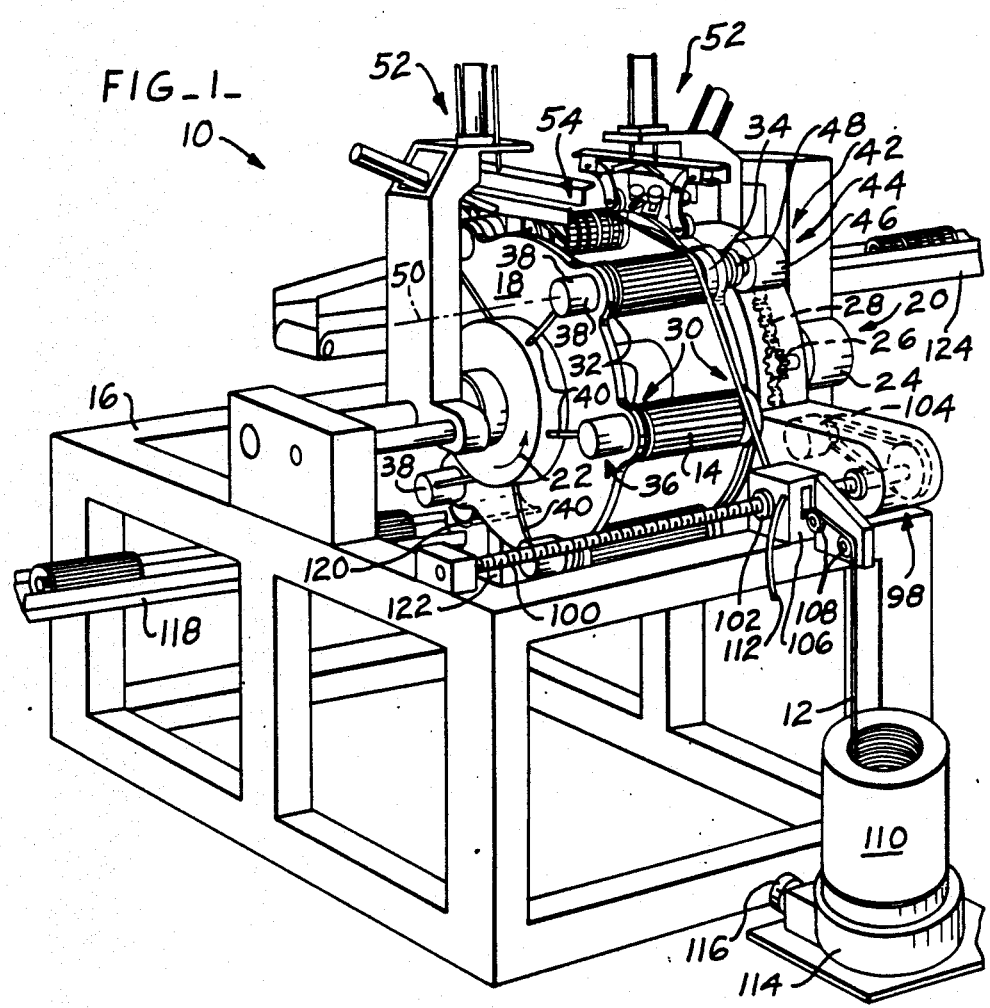
FIG-1-

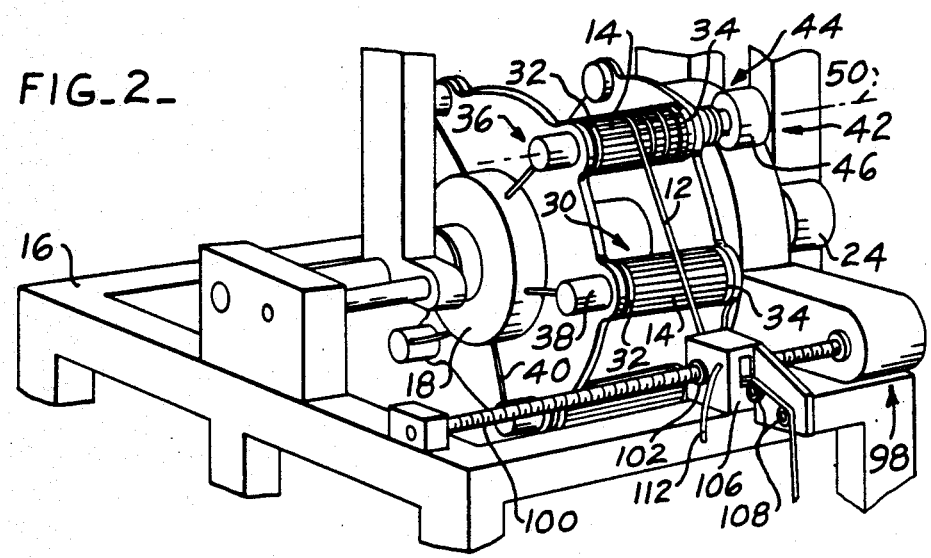
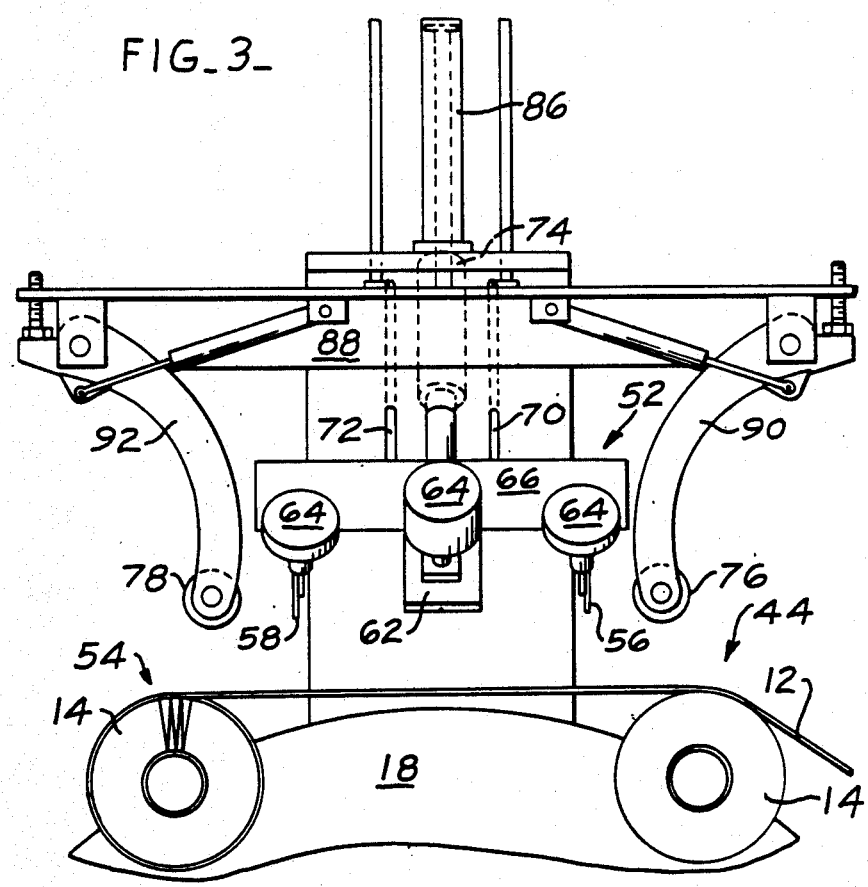

FIG_4_
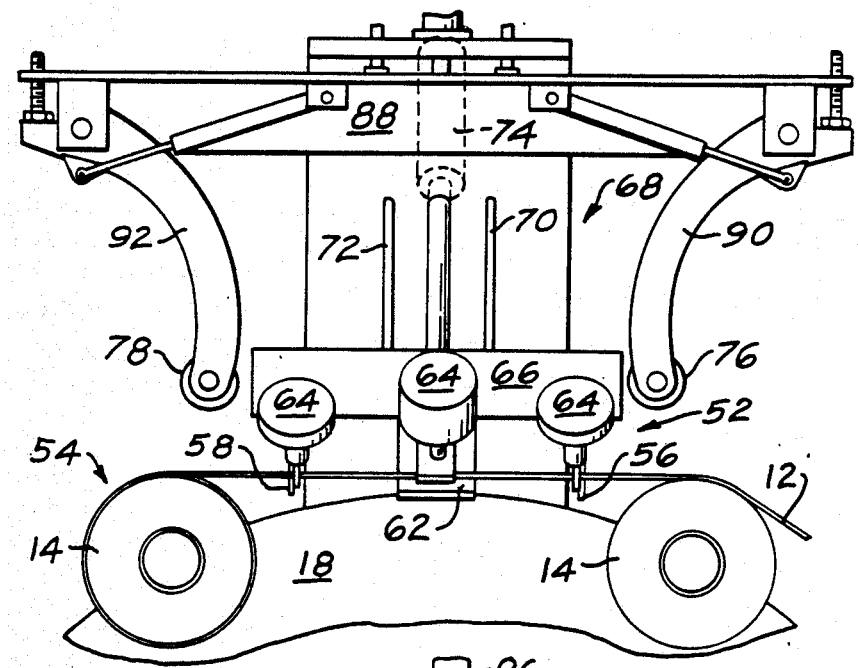
FIG_5_
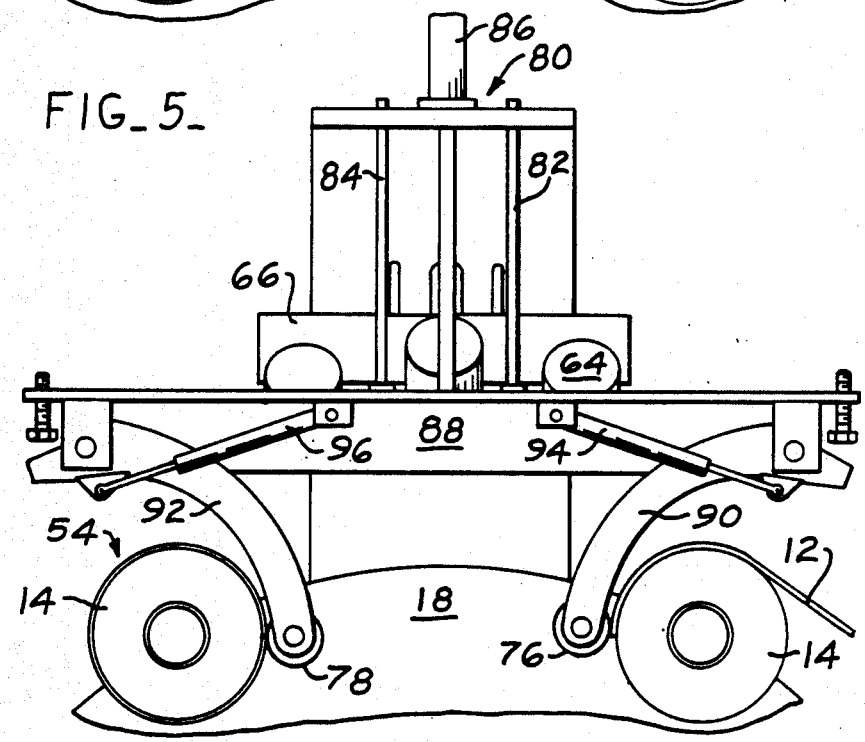

APPARATUS AND METHOD FOR WRAPPING AN EXTERNAL TAPE SUPPORT ABOUT A FILTER ELEMENT ASSEMBLY

DESCRIPTION

1. Technical Field

This invention relates generally to an apparatus and method for wrapping an external tape support about a filter element assembly and more particularly to such an apparatus and method capable of applying the external tape support to variously sized pleated filter element assemblies and in selectively spaced spiral patterns on such assemblies.

2. Background Art

Corrugated or pleated filter elements with external spiral tape supports are well known in the art. For example, U.S. Pat. No. 4,402,830, issued Sept. 6, 1983 to David B. Pall discloses a corrugated cylindrical filter element having an external spiral tape support. Pall teaches the use of a continuous high modulus fiber-reinforced tape of synthetic plastic material as an external spiral support for the corrugations of the pleated filter material. Similarly, U.S. Pat. No. 3,241,680 issued Mar. 22, 1966 to K. E. Humbert, Jr. discloses a pleated filter element having an adhesive coated length of string or twine spirally wound about the pleated filter material.

Heretofore the wrapping of an external tape support about a pleated filter element has been generally performed by hand assembly and is therefore a very labor-intensive, and consequently costly, operation. Furthermore, neither an apparatus nor method is known whereby both the leading and trailing ends of the material spirally wrapped about the filter element are automatically attached to the filter medium as part of the wrapping operation. Additionally, it has been difficult to both selectively control the spacing of adjacent spirals on the external wrap and apply the external support material to filter elements having varying diameters and lengths.

The present invention is directed to overcoming one or more of the problems set forth above. In particular, a wrapping apparatus embodying the present invention automatically secures a first end of a continuous strand of adhesive-coated tape to an outer pleated edge surface of a pleated filter element, controllably moves and positions the adhesive-coated tape longitudinally along the filter element while rotating the element, and then severs the spirally-wound tape from the continuous strand and attaches the second end to the outer edge surfaces of the pleated filter element.

DISCLOSURE OF THE INVENTION

In accordance with one aspect of the present invention, an apparatus for wrapping an external tape support about a pleated filter element assembly includes a frame, an indexable turret assembly rotatably mounted on the frame, and means for sequentially rotating the turret in one direction between the plurality of predetermined radial positions. A plurality of filter element clamps are rotatably mounted at spaced radial positions on the indexable turret and means are provided at a first radial position for controllably rotating one of the filter element clamps about a longitudinal axis. The apparatus further includes means for guiding and controllably varying the position of the strand of tape along the longitudinal axis of the clamp, and means for severing the continuous strand of tape and wrapping the severed ends of the tape about the pleated filter element assembly.

In another aspect of the present invention, a method for wrapping an external tape support about a pleated filter element includes the steps of clamping a pleated filter element between opposed surfaces of a clamp fixture, indexing the turret assembly and thereby aligning the clamp fixture with a first radial position, and contacting a continuous strand of adhesive coated tape with an outer edge surface of the pleated filter element. At the first radial position, a previously severed end of the adhesive coated tape is pressed into contact with a plurality of outer pleated edge surfaces of the filter element and the element is rotated about a longitudinal axis. During rotation the position of the tape material is controllably moved along the longitudinal axis to spirally wrap the tape externally about the pleated filter assembly. After completion of the spiral wrap operation, the filter element is indexed to a second radial position, and the continuous strand of tape is severed, producing a second severed end which is then pressed into contact with the spirally wound filter element assembly at the second radial position.

BRIEF DESCRIPTION OF THE DRAWINGS

FIG. 1 is an isometric view of an external tape support wrapping apparatus embodying the present invention;

FIG. 2 is a partial isometric view of the external tape support wrapping apparatus showing a partially wound filter element at a first radial position;

FIG. 3 is a plan view of a portion of the external tape support wrapping apparatus showing the severing means and tape-contacting rollers in a retracted position;

FIG. 4 is a plan view of a portion of the external tape support wrapping apparatus showing the severing means in an extended or cutting position;

FIG. 5 is a plan view of a portion of the external tape support wrapping apparatus showing the tape-contacting rollers pressing severed ends of the tape into contact with respective pleated filter element assemblies.

BEST MODE FOR CARRYING OUT THE INVENTION

An apparatus for wrapping a tape 12 about a pleated filter element assembly 14 is generally indicated by the reference numeral 10, and includes a frame 16 and an indexable turret assembly 18 rotatably mounted on the frame. A means 20 for sequentially rotating the turret assembly 18 in the direction indicated by the arrow 22 between a plurality of predetermined radial positions includes a drive motor 24 having a pinion gear 26 mounted on the output shaft of the motor and driving a ring gear 28 attached to the turret assembly 18. Alignment of the turret assembly 18 with the predetermined radial positions is provided by controlling the operation of the motor 24 by one or more conventional position or proximity sensing devices such as a limit switch, not shown.

A plurality of filter element clamps 30 are rotatably mounted at spaced radial positions on the indexably turret assembly 18. Each of the filter element clamps 30 have a pair of rotatably mounted face surfaces 32,34 each coated with rubber or similar material suitable for providing a compliant non-slip surface for contacting and conforming to the transverse pleated edges of the filter element 14 when clamped between the pair of face surfaces 32,34. In the preferred embodiment the face surface 32 is selectively movable between a first or open position at which the face surface 32 is spaced a first predetermined distance from the second face surface 34, and a second or clamped position at which the face surface 32 is spaced a second lesser distance from the face surface 34. Means 36 are provided at each of the filter element clamps 30 for moving the face surface 32 reciprocably toward and away from the face surface 34 and includes an air cylinder 38 connected to a source 40 of pressurized air.

A means 42 is provided at a first radial position 44 for controllably rotating the filter element clamp 30 when radially aligned with the first radial position 44, and includes a variable speed electric motor 46 mounted on the frame 16 and an electrically actuated magnetic clutch 48. A drive portion of the clutch is operatively connected to the output shaft of the motor 46 while the driven portion of the clutch 48 is connected to the face surface 34 of the filter element clamp 30. When the two clutch portions are engaged and the motor 46 actuated, the face surface 34 is rotated about a longitudinal axis 50 thereby rotating a pleated filter element 14 clamped between the face surfaces 32,34.

The tape wrapping apparatus 10 also includes means 52 for severing the continuous strand of tape 12 and wrapping the severed ends of the tape about a respective pleated filter element 14. The severing and tape-end wrapping means 52 is mounted on the frame 16 at a position between the first radial position 44 and a second radial position 54, and includes a pair of cutting tools 56,58 each being selectively movable between a first position, shown in FIG. 3, at which each of the cutting tools 56,58 are respectively radially spaced from the first and second radial positions 44,54, and a second position shown in FIG. 4, at which each of the cutting tools are respectively radially aligned with the first and second radial positions, such that when the pivotally interconnected blades of the cutting tools are in an open position, they intercept a strand of the tape 12 extending between filter elements 14 respectively supported by the clamps 30 at the first and second radial positions. Desirably, the severing and tape-end wrapping means 52 also includes a tape segment clamp 62 to temporarily hold a severed segment of the tape 12 after separation from the continuous strand. The opposed members of the tape segment clamp 62 and each of the cutting tools 56,58 are moved between open and closed positions by a small air operated actuator 64 operatively connected to each one of the members. The cutting tools 56,58, the tape segment clamp 62, and the associated air operated actuator 64, are mounted on a movable carriage 66. A means 68 for moving the cutting tools 56,58 between the first spaced and the second aligned positions includes a pair of guide rods 70,72, and a double acting air cylinder 74 all of which are operatively attached to the movable carriage 66.

The severing and tape-end wrapping means 52 also includes a first roller 76 disposed between the cutting tool 56 and the first radial position 44, and a second roller disposed between the cutting tool 58 and the second radial position 54. The rollers 76,78 are movable between a first position at which the rollers are respectively radially spaced from the first and second radial positions as shown in FIGS. 3 and 4 and a second position at which the first and second rollers respectively contact a filter element 14 clamped in the clamps 30 at the first and second radial positions as shown in FIG. 5.

A means 80 for moving the rollers 76,78 between the first spaced and second filter element contacting positions includes a pair of guide rods 82,84 and a double-acting air cylinder 86 attached to a movable carriage 88. The first and second rollers 76,78 are respectively rotatably mounted at one end of arcuate arms 90,92 which are pivotally attached at their opposite ends to the movable carriage 88. The roller ends of the arcuate arms 90,92 are moved in an arcuate direction about the pivoted ends by a pair of air cylinders 94,96 each having one end respectively attached to an offset portion of a respective arcuate arm 90,92 and an opposite end attached to the movable carriage 88.

Preferably the tape wrapping apparatus 10 includes two of the severing and tape-end wrapping means 52, one mounted on each side of the indexable turret assembly 18 as shown in FIG. 1. The separate, spaced severing and tape-end wrapping devices, permit the severing and wrapping of tape at each longitudinal end of the clamping stations 30, thereby permitting the spiral support to be applied first in one direction, and then in the opposite longitudinal direction to the following element.

The tape support wrapping apparatus 10 also includes a means 98 for selectively positioning the strand of tape 12 along the longitudinal axis 50 of the filter element clamps. The tape positioning means 98 is independently controllable with respect to the means 42 for rotating the filter element clamps and includes a worm-screw shaft 100 extending in a direction generally parallel with the longitudinal axis 50 and an output nut 102 riding along the shaft 100 and moving in a direction parallel to the longitudinal axis 50 in response to rotating the worm-screw shaft. The shaft is driven by a variable speed motor 104 mounted on the frame 16. The output nut 102 is attached to a carriage 106 and the carriage is moved longitudinally with the nut along the shaft 100. A plurality of rollers 108 are also mounted on the carriage and guide the tape 12 from a supply source 110, through an adhesive contacting chamber provided within the carriage 106, and thence to the first radial position 44 of the tape wrapping apparatus 10. Preferably a nozzle, not shown, is provided at the outlet of the adhesive supply chamber to controllably distribute the amount of adhesive applied to the surface of the tape 12. A source of adhesive material represented by the supply line 112 continuously replenishes the adhesive material contained within the carriage chamber and maintains the supply of adhesive in the chamber at a predetermined level. When employing hot melt glue as the adhesive coating on the tape material 12 it is desirable to maintain the adhesive supply chamber in the carriage 106 at a temperature sufficient to maintain the glue in a liquid state. This is easily accomplished by positioning a thermostatically-controlled heating element in, or adjacent to, the adhesive supply chamber.

It may be necessary, depending upon the form in which the tape 12 is supplied, to prevent or remove any twist from developing in the tape prior to delivery to the positioning means 98. For this reason it may be desirable to support the supply of tape 110 on a rotatable base member 114, which is rotated by a variable speed motor 116 a preselected speed consistent with the rate at which the tape is withdrawn from the tape supply 110.

INDUSTRIAL APPLICABILITY

The external tape support wrapping apparatus 10 of the present invention is particularly useful in pleated filter operations wherein it is desired to serially form spirally-wound external tape supports about preassembled filter elements as part of a continuous manufacturing operation. The apparatus 10 is adaptable to wrapping filter elements having a broad range of lengths and diameters, and spirally wrapping such a variety of filter elements with a selected one of several materials, such as string, flat tape, or twisted-strand roving, all of which may be constructed of natural or synthetic fibers. The support material may also be in the form of a pressure-sensitive tape having an adhesive material preapplied thereto. Alternatively, adhesive material such as plastisol or a hot melt type glue may be applied to the surface of the support material during the wrapping operation by directing the continuous strand of support material through the adhesive filled chamber provided in the carriage 106. Preferably, the spiral support material is a continuous strand of glass fiber roving, and the adhesive coating applied thereto is a hot melt type glue.

A method for wrapping an external tape support 12 about a pleated filter element 14 includes the steps of conveying an assembled filter element or cartridge; i.e., an annularly shaped pack of longitudinally pleated filter media circumscribing a central hollow perforated core member, to a clamp fixture 30 mounted on an indexable turret assembly 18. The assembled filter element is delivered to the tape support wrapping apparatus 10 by a conventional transfer conveyor 118, and deposited onto a cradle 120. An air cylinder 122 moves the cradle 120 in a vertically upward direction and positions the filter cartridge between opposed face surfaces 32,34 of a filter element clamp 30. The air cylinder 38 is then actuated and the face surface 32 at the cartridge loading station moves toward the face surface 34 thereby clamping the filter cartridge between the opposed face surfaces 32,34.

Following the clamping of a filter cartridge 14 in a clamp fixture 30, the turret assembly 18 is indexed to the first radial position 44. After contacting the continuous strand of adhesive coated tape 12 with at least one of the outer pleated edge surfaces of the filter element 14 carried in the clamp fixture 30 at the first radial position, the tape 14 is severed or cut at a position between the first radial position 44 and the second radial position 54 at which a second pleated filter element 14 has a spirally-wound tape support previously wrapped thereon. The severed end of the tape 12 adjacent the first radial position 44 is pressed into contact with the outer pleated edge surfaces of the filter cartridge at the first radial position by bringing the first roller 76 into contact with the severed end of the tape and pressing the severed end into contact with the filter element, as shown in FIG. 5. This action is accomplished by actuating the air cylinder 86 to move the carriage 88 toward the first and second radial positions 44,54 and further actuating the air cylinder 94 to pivotally move the arcuate arm 90 toward the filter cartridge assembly mounted at the first radial position. After the severed end of the tape 12 is pressed into contact with the outer edge surfaces of the pleated filter cartridge 14 at the first radial position, the air cylinders 94 and 86 are again actuated to retract the roller 76 and move the carriage 88 away from the first radial position.

After securing a severed end of the tape 12 to the filter element 14, preferably at a position adjacent a longitudinal end of the filter cartridge, the clutch 48 is actuated and the motor 46 is coupled with the face surface 34. Next, the filter element is rotated about the longitudinal axis 50 by operating the motor 46, and simultaneously therewith, the position of the tape 12 is moved in one direction along the longitudinal axis is spirally wrap the tape externally about the filter element as shown in FIG. 2. The position of the tape material is moved along the longitudinal axis by operating the motor 104 and rotating the worm-screw shaft 100 to drive the carriage 106 mounted on the output nut 102. Tape is continuously drawn from the supply 110, through the adhesive coating chamber and nozzle in the carriage 110 by the rotating filter element. The wrapping proceeds in this manner until the tape support is completely formed about the external surface of the filter element 14, and the tape is positioned at an end of the filter element opposite the starting end.

The spirally-wound filter element assembly 14 is then indexed to a second radial position as shown in FIG. 1, and the continuous strand of tape 12 is drawn across a following filter element assembly newly positioned at the first radial position. The continuous strand of tape is severed by moving the carriage 66 to a position, as shown in FIG. 4, whereat the cutting tools 56,58 and the tape segment clamp 62 intersect the tape 12 extending between the filter elements mounted at the first and second radial positions. The tape 14 is cut at two points by the respective cutting tools 56,58 producing two severed end pieces and a loose segment which is clamped between the opposed members of the tape segment clamp 62.

After severing the continuous strand of tape 12, the carriage 66 is retracted as shown in FIG. 5. The pivotally interconnected blades of the cutting tools 56,58 are opened, along with the clamping members of the tape segment clamp 62, by action of the air operated actuators 64 thereby permitting the severed segment of the tape 12 to drop into a waste collection container, not shown. Simultaneously with severing the tape 12, the carriage 88 is extended toward the first and second radial positions and the first and second rollers moved into contact with the severed end portions of the tape. Air cylinders 94,96 are actuated to move the arms 90,92 respectively toward the filter elements supported at the first and second radial positions and the loose ends of the tape pressed into contact with the outer pleated edge surfaces of the filter elements.

After completion of the wrapping operation the turret assembly 18 is indexed and the finished spirally wrapped filter element 14 is transferred to a discharge station. At the discharge station, the face surface 32 is moved away from the face surface 34 thereby releasing the spirally-wrapped filter element assembly from the clamp member 30 and depositing the completed assembly onto a discharge conveyor 124.

Other aspects, objects and advantages of this invention can be obtained from a study of the drawings, the disclosure, and the appended claims.

We claim:
1. An apparatus for wrapping an external tape support about a pleated filter element, the apparatus comprising:
   a frame;
   an indexable turret assembly rotatably mounted on said frame;
   means for sequentially rotating said turret assembly in one direction between a plurality of predetermined radial positions;
   a plurality of filter element clamps rotatably mounted at spaced radial positions on said indexable turret;

means at a first of said predetermined radial positions for controllably rotating one of said filter element clamps about a longitudinal axis in response to said one clamp being radially aligned with said first predetermined radial position, said means including a drive motor mounted on said frame at said first radial position and clutch means for selectively connecting said motor to a preselected one of said filter element clamps;

means for selectively positioning a strand of tape along said longitudinal rotational axis of said clamp in a spaced-apart spiral pattern about said pleated filter element; and means for severing said strand of tape and wrapping the severed ends of said tape about respective pleated filter elements, said severing and tape-end wrapping means being mounted on said frame at a position between said first predetermined radial position and an adjacent second radial position on said indexable turret.

2. An apparatus for wrapping an external tape support about a pleated filter element, as set forth in claim 1, wherein each of said plurality of said filter element clamps have a pair of rotatably mounted face surfaces, at least one member of said pair of face surfaces being selectively movable between a first position at which said one face surface is spaced a first predetermined distance from a second face surface of said pair, and a second position at which said surfaces are spaced a second lesser distance apart, and means at each clamp for moving said movable face surface between said first and second positions.

3. An apparatus for wrapping an external tape support about a pleated filter element, as set forth in claim 1, wherein said severing and tape-end wrapping means includes:

at least one cutting tool, said tool being selectively movable between a first position at which said cutting tool is radially spaced from said first and said second radial positions, and a second position at which said cutting tool is radially aligned with said first and said second radial positions, and said cutting tool when in an open position intercepts a strand of tape extending between filter elements respectively supported by said clamps at the first and second radial positions; and means for moving said cutting tool between said first spaced and said second aligned positions.

4. An apparatus for wrapping an external tape support about a pleated filter element, as set forth in claim 1, wherein said severing and tape-end wrapping means includes:

a first roller disposed between said cutting tool and said first radial position;

a second roller disposed between said cutting tool and said second radial position, said first and second rollers being movable between a first position at which said rollers are respectively radially spaced from said first and second radial positions, and a second position at which said first and second rollers respectively contact a filter element when clamped in said clamps at said first and second radial positions; and, means for moving said rollers between said first spaced and said second filter element contacting position.

5. An apparatus for wrapping an external tape support about a pleated filter element, as set forth in claim 1, wherein said means for selectively positioning a strand of tape includes:

a motor mounted on said frame;

a worm-screw shaft extending in a direction generally parallel with said longitudinal axis and operatively connected to said motor;

an output nut mounted on said worm-screw shaft, said output nut moving longitudinally along said shaft in response to rotating said shaft;

a carriage attached to said output nut and moving in compliance therewith along said shaft; and, a plurality of tape-guiding rollers mounted on said carriage.

6. An apparatus for wrapping an external tape support about a pleated filter element, as set forth in claim 5, wherein said means for selectively positioning the strand of tape along said longitudinal axis of said clamp is independently controllable with respect to said means for rotating said one filter element clamp.

7. An apparatus for wrapping an external tape support about a pleated filter element, as set forth in claim 1, wherein said apparatus includes means for applying a surface coating of an adhesive material to said strand of tape.

8. An apparatus for wrapping an external tape support about a pleated filter element, as set forth in claim 1, wherein said apparatus includes means for supporting and rotating a supply of flat tape to remove any twist in said tape prior to delivering said tape to said tape positioning means.

9. A method for wrapping an external tape support about a pleated filter element, including the steps of:

conveying a first pleated filter to a clamp fixture mounted on an indexable turret assembly;

clamping said first pleated filter between opposed face surfaces of said clamp fixture;

indexing said turret assembly and aligning said clamp fixture with a first radial position;

contacting a continuous strand of adhesive-coated tape with at least one outer edge surface of said first pleated filter carried in said clamp fixture;

cutting said continuous strand of tape at a position between said first radial position and a radial position at which a second pleated filter element has a spirally-wound tape support previously disposed thereon;

pressing a severed end of said adhesive-coated tape into contact with the outer edge surfaces of said first pleated filter assembly at said first radial position;

rotating said first pleated filter element at said first radial position about a longitudinal axis and simultaneously moving the position of said tape material in one direction along said longitudinal axis to spirally wrap said tape externally about said first pleated filter element;

indexing said spirally-wound first pleated filter element to said second radial position;

contacting the continuous strand of adhesive-coated tape with at least one outer edge pleat of a third pleated filter element positioned at said first radial position;

cutting said continuous strand of tape at a position between said first and second radial positions;

pressing a severed end of said adhesive coated tape into contact with the outer edge surfaces of said first pleated filter element;

indexing said spirally-wrapped first pleated filter element to a third radial position; and, conveying said spirally-wrapped first pleated filter element from said third radial position.

* * * * *